UNITED STATES PATENT OFFICE.

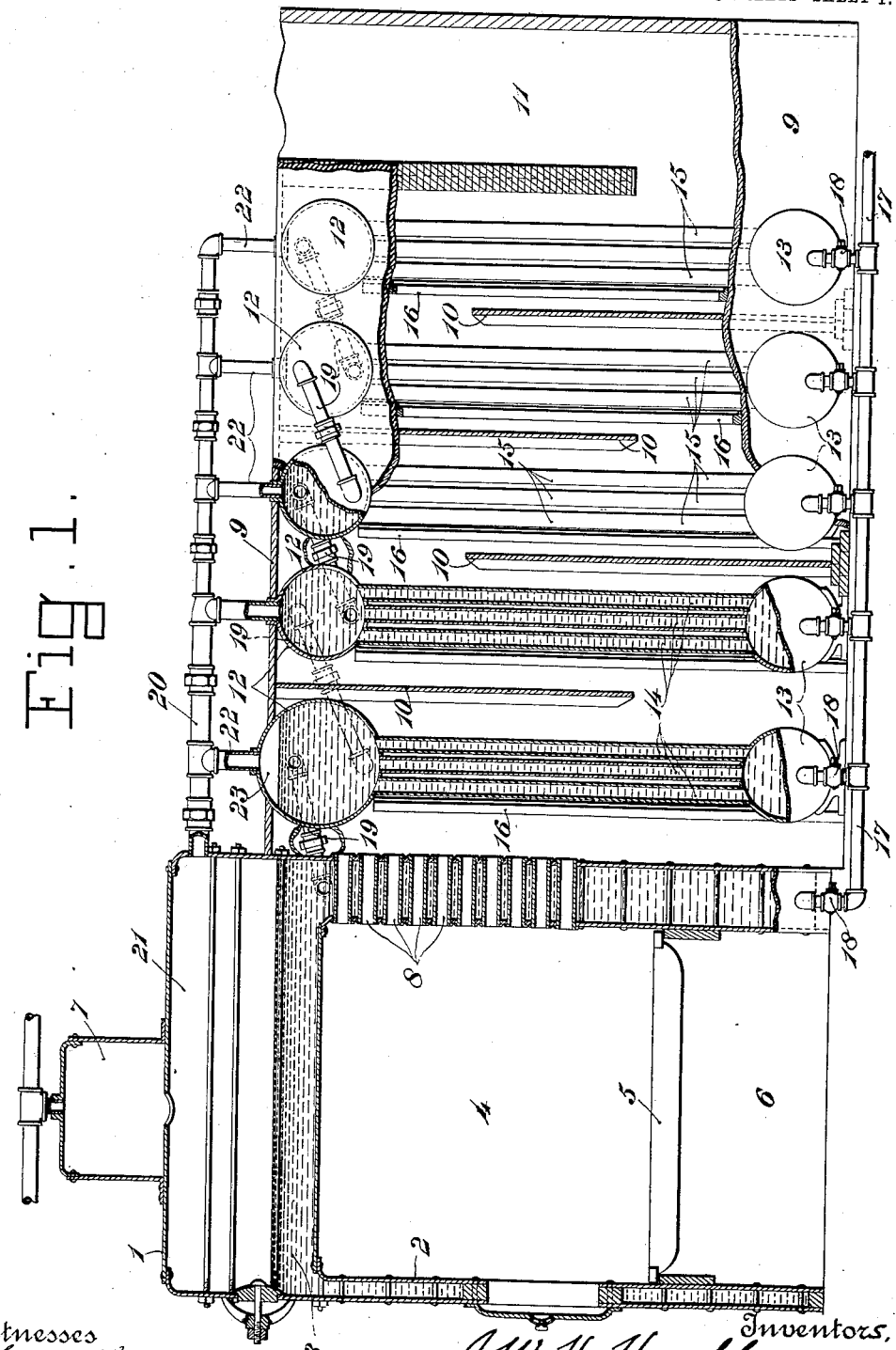

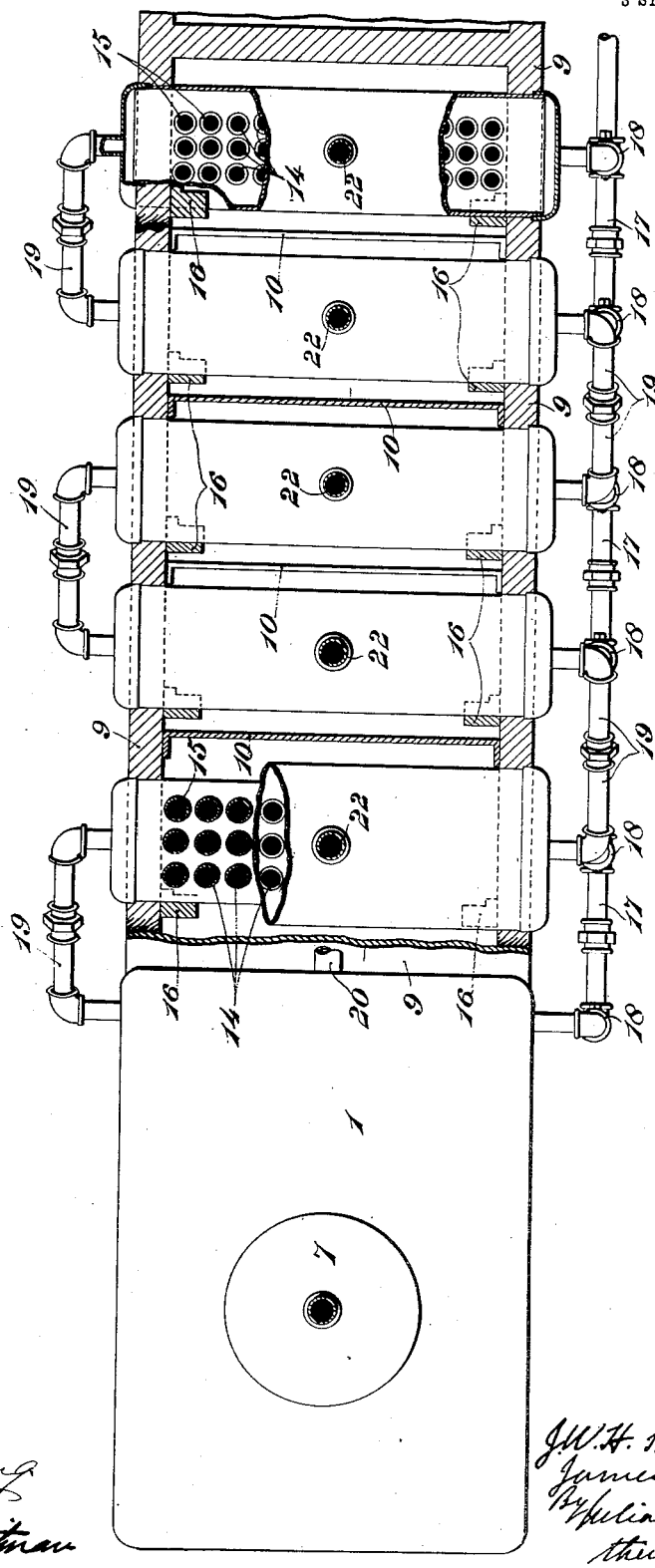

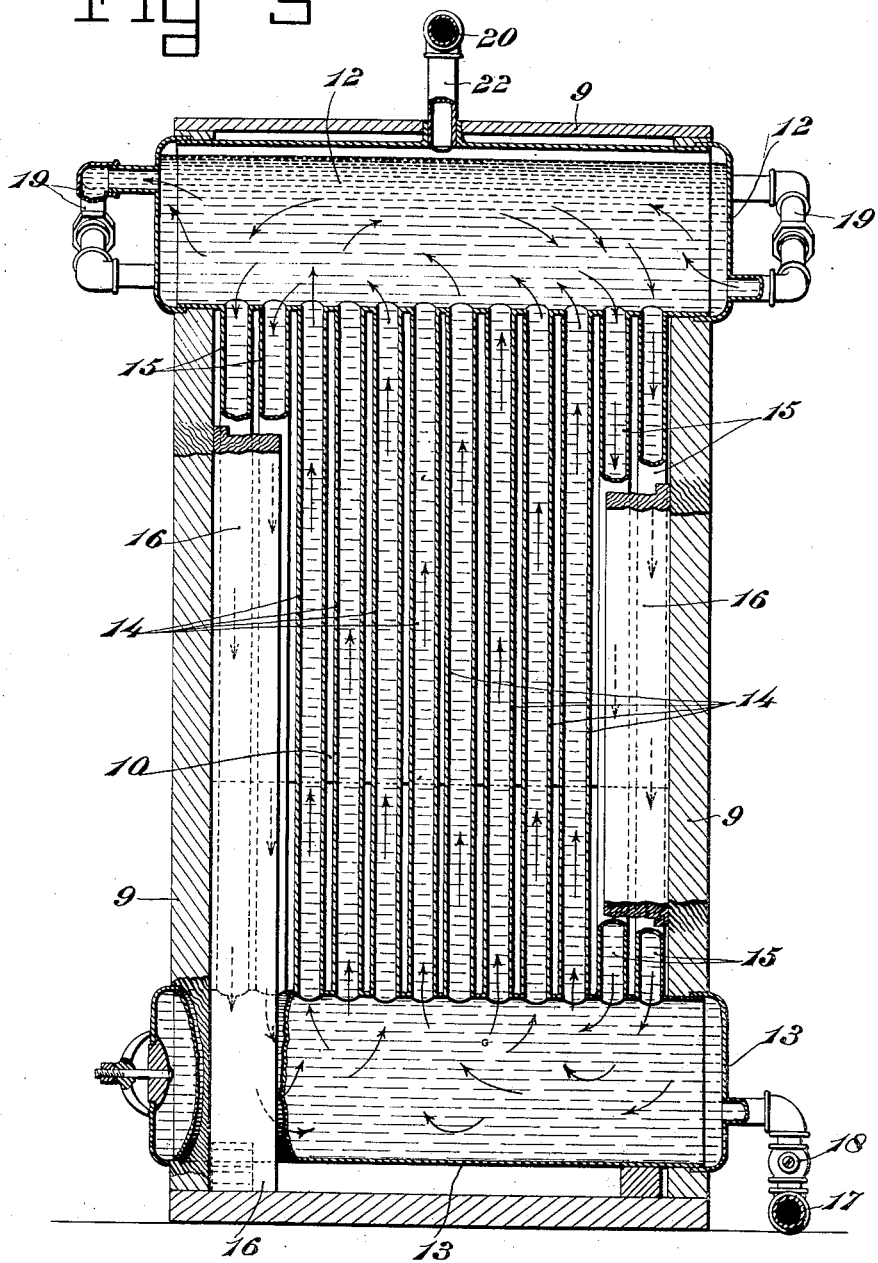

JOHN WILLIAM HOMER HANDLEY AND JAMES McCARTNEY, OF MOBILE, ALABAMA.

BOILER.

No. 910,531.

Specification of Letters Patent.

Patented Jan. 26, 1909.

Application filed May 18, 1908. Serial No. 433,504.

*To all whom it may concern:*

Be it known that we, JOHN WILLIAM HOMER HANDLEY and JAMES MCCARTNEY, citizens of the United States, residing at Mobile, in the county of Mobile and State of Alabama, have invented certain new and useful Improvements in Boilers; and we do hereby declare the following to be a full, clear, and exact description of the invention, such as will enable others skilled in the art to which it appertains to make and use the same.

The object of this invention is to improve the construction and increase the efficiency of water-tube steam-boilers of the compound or sectional type, having a connected series of independent batteries or water-tube boiler-sections through which a circulation of water is maintained while the products of combustion pass successively through the sections in a direction opposite to the flow of water. Boilers or this type possess the advantage of economical utilization of the heat-energy generated in the furnace by subjecting the hottest water to the highest temperature and the coolest water to the lowest heat, the temperature of the water being gradually raised in the successive sections by absorption of their *pro rata* amounts of heat from the passing flame or gases of gradually diminishing temperature.

In the accompanying drawings, which form a part of this specification, we have illustrated a preferred embodiment of our invention, which will first be described by reference to said drawings and then more particularly pointed out in the claims at the end of this description.

Figure 1 is a longitudinal sectional view of the boiler with parts in elevation. Fig. 2 is a plan view, with the top of the casing of the batteries removed, and with parts in horizontal section. Fig. 3 is a transverse section with parts in elevation.

As shown in the drawings, the boiler comprises a main boiler-section, including a furnace fire-box, and a series of supplementary water-tube sections or batteries, the latter operating substantially as feeders or preheaters to the main boiler-section in which the steam is principally generated.

The main-boiler-section comprises an outer boiler-shell 1 and inclosed or inner fire-shell 2, whereby the water-chamber 3 surrounds or jackets the combustion-chamber 4 including the grate-bars 5 and ash-pit 6. On the boiler-shell is mounted a steam-dome 7.

A group of short fire-flues 8, connecting the back flue-plates of the shells 1 and 2, lead through the rear of the main boiler-section for discharging the hot products of combustion into the fire-chamber of the first water-tube section or battery.

Behind and adjacent to the main boiler-section, a housing 9 of masonry provides the casing or setting for the series of water-tube boiler-sections; the interior of which casing is transversely partitioned or divided by baffle-walls 10 into a series of communicating fire-chambers. Depending baffle-walls alternate with upstanding baffle-walls, and provide a zigzag or alternating up and down passage for the products of combustion to the stack-flue 11. In the said fire-chambers are respectively arranged the water-tube sections or boilers, each comprising an upper drum 12 and lower drum 13 connected by a bank of closely assembled water-tubes or pipes 14, 15. The ends of the drums are set in and preferably extend through the side walls of the casing 9, the water-tubes 14 and 15 being all inside. The outer rows of said water-tubes, that is the tubes 15 nearest the ends of the water-drums, serve as down-current pipes; while the intermediate tubes 14 serve as up-current pipes. This results from the lower temperature to which the outer tubes 15 are subjected, compared with the intermediate tubes 14 which are all in the direct path of the flames or hot currents. Said outer tubes 15 are near the side walls of the casing 9, and they are also protected by vertical shields or baffles 16 on the inner sides of said walls, said shields being respectively arranged forward for the pipes 15 so as to ward off the hot currents and prevent them from striking said outer rows. So the outer tubes are less exposed, whereas the heat is directed against and envelops the entire portions of the intermediate tubes. Hence the water will rise in the hotter tubes 14 and descend in the cooler tubes 15, thus giving each section or battery a separate and continuous circulation independent of the circulation from one battery to another.

The bottom water-drums 13, as well as the bottom of the main boiler-section, are all connected with a common feed-water pipe 17 having branches provided with stop-cocks 18 leading into the heads of the drums. This provides for initial filling of all the sections, but in ordinary practice the water is supplied only to the lower drum of the last or coolest section. So the extension of the feed-pipe to the other sections is not essential, though it is adopted as a safe-guard.

The upper water-drums 12 are connected one to another in series, and preferably at alternate ends, by circulating and water-equalizing pipes 19, connecting the heads of the drums on the outside of the casing where they are beyond the action of the heat which would interfere with the proper circulation of the water. Each pipe 19 leads from the upper portion of one drum, just below the water-line, downwardly to the lower portion of the drum next in front. By this arrangement, the hottest water is carried forward from each drum, and the level of the rearward drums is prevented from falling. By arranging the pipes 19 at alternating sides of the boiler, the effective circulation of the water is still further promoted by causing it to flow lengthwise through the successive upper drums in opposite directions.

The pressure-equalizing pipe 20, leading from the steam space 21 of the main boiler-section, is in constant communication by branch-pipes 22 with the several upper drums 12, whereby different sections or batteries, while of successively different temperatures, are maintained at equal pressure, permitting the free flow or circulation of water from one battery to the next.

The upper drum 12 of the first or hottest water-tube section, nearest the main boiler-section, is relatively larger than the others and has a steam-space 23 placed above the top of the casing. In this section steam is generated in conjunction with the generation of steam in the main boiler-section, while the other batteries serve substantially as successive preheaters to raise the water to the boiling point. The upper drums of the other batteries are placed wholly within the casing, except that their ends extend through the side walls as aforesaid, and said upper drums are joined by the branch-pipes 22 to the pressure-equalizing pipe 20 at the top of the casing; and in practice the water-line is kept at about this point, the water completely filling the upper drums, excepting the drum of the first or hottest section. This prevents steam in the pressure-equalizing pipe from giving heat to these sections, which should be avoided.

After the boiler has been filled to the desired water-line, the cocks 18 are closed, shutting off the feed-water. When the boiler is fired and begins to generate steam, the feed-water is let into the lower drum of the last or coolest section, which is farthest from the fire-box; and as the water in the main boiler-section is converted into steam, tending to lower the water-line, the water in the system seeks its level, flowing from one section to the other and getting hotter each time until it is finally converted into steam. Each battery being at a different temperature but at the same pressure will absorb the heat so long as the temperature of the water in such battery is lower than the temperature of the heat or gases which surround it, on the same principle that a cold iron placed beside a hot iron will absorb heat until the temperatures are equalized, and thus the heat is successively absorbed by the several batteries of gradually diminishing temperatures, so that practically all available heat from the fuel is effectually utilized instead of passing as waste up the stack or chimney.

It is noted that the several sections or batteries are virtually independent, but are in communication with a common pressure-equalizing pipe, and connected in series by the water-level-equalizing pipes, placed outside beyond the influence of the heat, so that the requisite flow of water is assured to maintain the proper level as steam is generated. At the same time, the arrangement of the water-equalizing pipes, connecting the upper drums at alternate ends, so manages the circulation through the system as not to disturb materially the independent circulation through the individual batteries. Said water-level-equalizing pipes 19, having their inlet ends respectively connected to the upper portions of the top drums, insure the flow of the hottest water in each section into the hotter battery next in front; and this arrangement also prevents the water-level from falling to an injurious degree in the rearmost or any of the drums, and maintains approximately the desired water-level; the feed-pipe 17 supplying the feed-water into the lower drum in the last and coolest section. By the time the water reaches the hottest bank of tubes and the main boiler-section, very little additional heat is required to convert it into steam; so that comparatively little of the initial heat is consumed, and the products of combustion pass rearward at a comparatively high temperature for heating the successive water-tube sections each of which absorbs its *pro rata* amount of heat. The several water-tube sections or batteries are exposed in the communicating fire-spaces or fire-chambers so as to be wholly surrounded by the hot gases, except the outer tubes 15 which as aforesaid are protected by the shields or baffles 16 which deflect back the heat and maintain these tubes at a relatively low temperature, which results in their operation as down-current tubes, producing effective individual circulation in the individual batteries.

We claim as our invention and desire to secure by Letters Patent of the United States:

1. A compound water-tube boiler having a main boiler-section, provided with an interior fire-box, and a casing extending rearward therefrom, and a series of independent water-tube boiler-sections in said casing, the latter having baffle-walls between said sections providing separate communicating fire-chambers; a plurality of fire-tubes leading from the fire-box through the rear of the main boiler-section for introducing the hot products of combustion into the first or hottest fire-chamber; means for introducing feed-water into the last or coolest water-tube section, and circulating and water-level equalizing pipes connecting said water-tube sections in series and with the main boiler-section; and a pressure-equalizing pipe leading from the steam-space of the main boiler-section and communicating with the tops of all the water-tube sections; whereby the series of water-tube sections, working at different temperatures but equal pressure, serve as pre-heaters and feeders for the main boiler-section in which the steam is principally generated.

2. A compound water-tube boiler having a main boiler-section and a series of independent water-tube sections each comprising an upper drum and lower drum with a connecting bank of circulating tubes, a fire-box in the main boiler-section, a casing inclosing the water-tube sections and in communication with said fire-box and having interior baffle-walls between said sections providing communicating fire-chambers, means for feeding water to the last or coolest section, circulating and water-level equalizing pipes connecting the water-tube sections in series, and a pressure-equalizing pipe leading from the steam-space of the main boiler-section and communicating with all the upper drums, the first or hottest water-tube section having a relatively larger upper drum providing a steam-space which extends through and above the top of the casing, while the other upper drums are wholly within or below the top wall of the casing and adapted to be filled with water.

3. In a compound water-tube boiler, the combination of a fire-chamber, a series of independent water-tube boiler-sections or batteries each comprising upper and lower drums with connecting water-tubes, baffle-walls between said sections, a feed-water pipe for feeding water to the last or coolest section, water-circulating and level-equalizing pipes connecting said sections in series and having their inlet ends at the upper portions of the respective upper drums, a steam-chamber, and a pressure-equalizing pipe in communication with said chamber and with the tops of all the upper drums.

4. In a compound water-tube boiler, the combination of a fire-chamber, a series of independent water-tube boiler-sections or batteries in said fire-chamber each comprising upper and lower drums with connecting water-tubes, baffle-walls between said sections, a feed-water pipe for feeding water to the last or coolest section, circulating and water-level equalizing pipes arranged outside the casing and connecting the upper drums in series and at opposite ends alternately, a steam-chamber, and a pressure-equalizing pipe in communication with said steam-chamber and with all the upper drums.

5. In a compound water-tube boiler, the combination of a fire-chamber, a series of independent water-tube boiler-sections or batteries in said chamber comprising upper and lower drums and connecting banks of water-tubes, baffle-walls between the sections, shields on the inner sides of said casing for protecting the outer or end tubes of the sections from the greatest heat, whereby the lower temperature of said outer tubes cause down-currents therein and give an independent circulation in each battery, means for introducing feed-water in the last or coolest section, water-circulating and water-level equalizing pipes outside the casing connecting each upper drum with the next forward section, and a pressure-equalizing pipe in communication with all the upper drums.

In testimony whereof we affix our signatures, in presence of two witnesses.

JOHN WILLIAM HOMER HANDLEY.
JAMES McCARTNEY.

Witnesses:
MOSES KOHN,
WM. ABRAMS.